(12) United States Patent
Riehle

(10) Patent No.: US 8,500,433 B2
(45) Date of Patent: Aug. 6, 2013

(54) SCREW MACHINE

(75) Inventor: Ralf Riehle, Duβlingen (DE)

(73) Assignee: Coperion GmbH, Stuttgart (DE)

( * ) Notice: Subject to any disclaimer, the term of this patent is extended or adjusted under 35 U.S.C. 154(b) by 449 days.

(21) Appl. No.: 12/630,413

(22) Filed: Dec. 3, 2009

(65) Prior Publication Data
US 2010/0143518 A1    Jun. 10, 2010

(30) Foreign Application Priority Data
Dec. 6, 2008  (EP) .................................... 08021246

(51) Int. Cl.
*B29C 47/44*    (2006.01)

(52) U.S. Cl.
USPC ........... 425/192 R; 366/79; 366/84; 425/204; 425/205

(58) Field of Classification Search
USPC ................ 425/190, 192 R, 204, 205; 366/79, 366/85, 91, 290
See application file for complete search history.

(56) References Cited

U.S. PATENT DOCUMENTS 4,004,787 A    1/1977 Ellwood et al.
4,385,553 A  *  5/1983 Ihara et al. ...................... 99/510
5,910,276 A    6/1999 Guntherberg et al.
2006/0076705 A1 *  4/2006 Fowler et al. ............ 264/211.23
2008/0259717 A1   10/2008 Blach

FOREIGN PATENT DOCUMENTS

| DE | 10 2004 051 203 | 5/2006 |
|---|---|---|
| EP | 0 734 825 | 10/1996 |
| EP | 0 849 065 | 6/1998 |
| EP | 1 990 176 | 11/2008 |

OTHER PUBLICATIONS

European Search Report for application No. EP 08 02 1246 dated May 28, 2009 (7 pages).

* cited by examiner

*Primary Examiner* — Yogendra Gupta
*Assistant Examiner* — Joseph Leyson
(74) *Attorney, Agent, or Firm* — Husch Blackwell LLP

(57) ABSTRACT

A screw machine, in particular an extruder, has a housing which has a supply opening at a supply end. At least one bore with a longitudinal axis is provided, in which a screw shaft is rotatably arranged. The drive takes place by means of a drive motor using a gear, the output shaft of which has a rotary drive connection to the screw shaft. Provided between the housing and the gear is a slide connection, which allows a displacement of the housing relative to the gear in the direction of the longitudinal axis.

8 Claims, 4 Drawing Sheets

SCREW MACHINE

FIELD OF THE INVENTION

The invention relates to a screw machine with a housing, which has a supply end, a discharge end and a supply opening at the supply end, with at least one screw bore, which is located in the housing, with a longitudinal axis, with a screw shaft rotatably arranged in the screw bore, with a drive motor, with a gear, which is in drive connection with the drive motor, and has an output shaft connected to the screw shaft.

BACKGROUND OF THE INVENTION

Screw machines of this type are heated, in particular when starting up, from room temperature to a very high operating temperature, generally of between 200° C. and 300° C., so both the respective housing and the respective screw shaft or, in the case of multi-shaft machines, the screw shafts, expand in the longitudinal direction. The screw shaft non-rotatably provided on an output shaft of the gear in each case expands here toward its screw tip, in other words toward the discharge end of the housing. This is easily possible as axial play is present in any case in the region between the screw tip and the discharge end of the housing. It is conventional in practice for the thermally caused expansion of the housing to be compensated in that a slide connection is present at the discharge end, as is known, for example, from EP 0 849 065 A1 (corresponding to U.S. Pat. No. 5,865,472).

It is often necessary, for operating or structural reasons, to also fix the discharge end of the housing in the direction of the longitudinal axis. The problem then occurs here that the axial expansion of the housing has to be absorbed by the gear and optionally the motor arranged behind it. For this purpose, complex multi-ball bearings are used in practice for the gear and optionally the drive motor to make these displaceable as a whole.

A screw machine according to the generic type is known from US 2006/0076705 A1. To compensate thermally caused longitudinal expansions a gap is provided here between the housing of the screw machine and an attachment housing of the gear, so the housing of the screw machine can thermally expand toward the gear. A defined position between the gear and housing of the screw machine cannot be achieved by this.

It is known from EP 1 990 176 A1 to configure a slide connection between an extruder and a melt line adjoining the latter.

SUMMARY OF THE INVENTION

The invention is based on the object of configuring a screw machine in such a way that longitudinal expansions of the housing can be compensated in a simple manner.

This object is achieved in a screw machine of the generic type wherein a slide connection is arranged between the housing and the gear in the direction of the longitudinal axis, and wherein the slide connection has an adapter, which has a screw bore portion connected to the housing and a bearing portion facing the gear, and wherein an attachment housing surrounding the output shaft is provided on the gear and has a bearing opening supporting the housing transversely with respect to the longitudinal axis. The core of the invention is that—viewed in the production direction of the screw machine—directly before the housing, in other words directly before the supply end of the machine, a slide connection is arranged, by means of which the thermally caused longitudinal expansions of the housing can be absorbed and compensated. At the same time, there is a reciprocal support between the housing of the screw machine and the gear perpendicular to the longitudinal axis.

Moreover, further features, advantages and details of the invention emerge from the following description of an embodiment with the aid of the drawings.

DESCRIPTION OF THE PREFERRED EMBODIMENT

Figure 1:
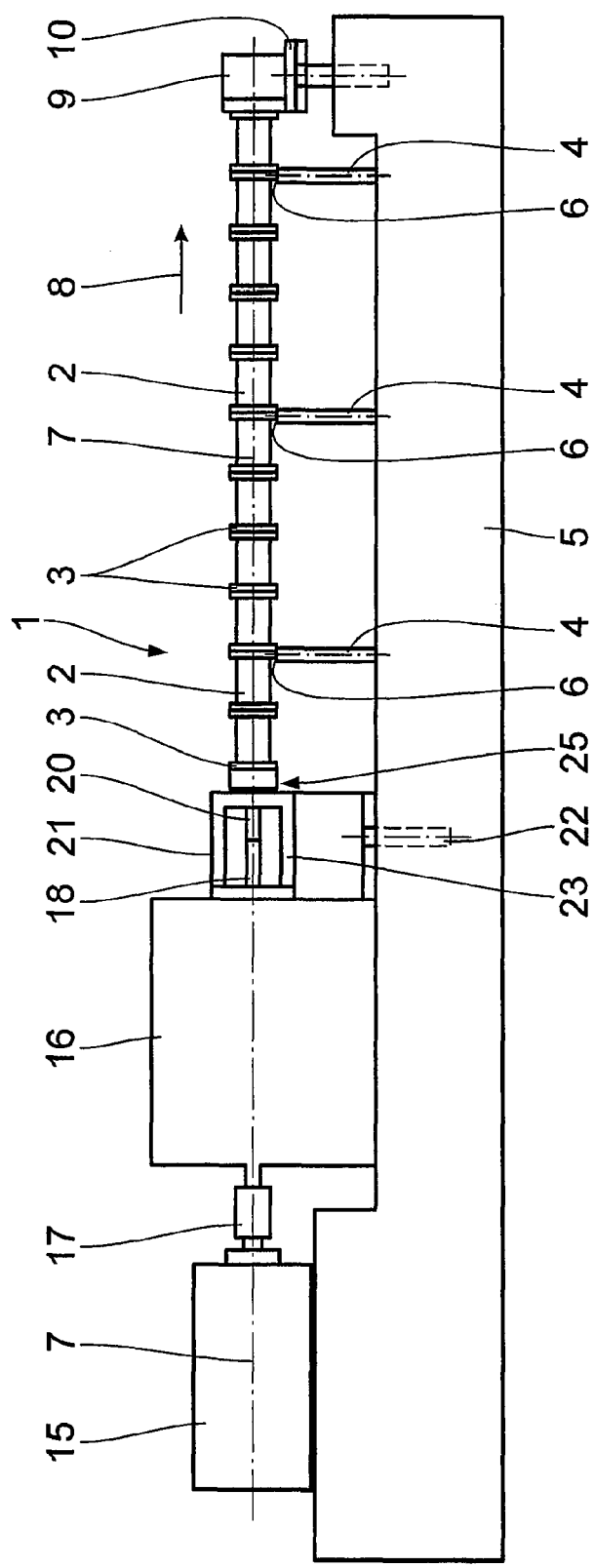
FIG. 1 shows a side longitudinal view of a screw machine configured as a two-shaft extruder.

The screw machine shown in the drawings is a conventional extruder. This has a housing 1 composed of individual housing portions 2, so-called housing sections, which are connected to one another by means of flanges 3.

The housing 1 is supported relative to a base 5 by means of supports 4, slide bearings 6 being arranged between the supports 4 and the housing 1, by means of which slide bearings the housing 1 can be displaced in the direction of its longitudinal axis 7. The support by means of the supports 4 thus substantially takes place in the vertical direction. In the region of a discharge end 9, which is downstream in a production direction 8, the housing 1 is fixed by means of a connection 10 both in the vertical direction and in the direction of the longitudinal axis 7. This discharge end 9 of the housing 1 is thus stationarily fixed.

The screw machine is configured as a two-shaft extruder, in other words, it has two screw bores 11, 12 extending in the direction of the mutually parallel longitudinal axes 7 and passing through one another in the shape of an 8, in which screw bores two screw shafts 13, 14 are arranged parallel to one another and are configured to be closely meshing.

The screw shafts 13, 14 are driven by an electric motor 15 and a reducing and branching gear 16, a clutch 17 being arranged between the motor 15 and gear 16. The output shafts 18 of the gear 16 are connected in a conventional manner by means of clutch sleeves 19 to the drive journals 20 of the screw shafts 13, 14. These clutch sleeves 19 are located in an attachment housing 21, a so-called lantern, of the gear 16. This attachment housing 21 is also supported by means of a support 22 relative to the base 5 in the vertical direction.

The housing 1, i.e. the housing portion 2 closest to the attachment housing 21 and forming a supply end, is not—as conventional—rigidly connected in the direction of the longitudinal axis 7 to the attachment housing 21, but displaceably guided in its facing end wall 23 by means of a slide connection 24 in the direction of the longitudinal axis 7, and rigidly supported perpendicularly with respect to this, in other words in the direction which is vertical and extends horizontally transversely with respect to the longitudinal axis 7.

Figure 2:
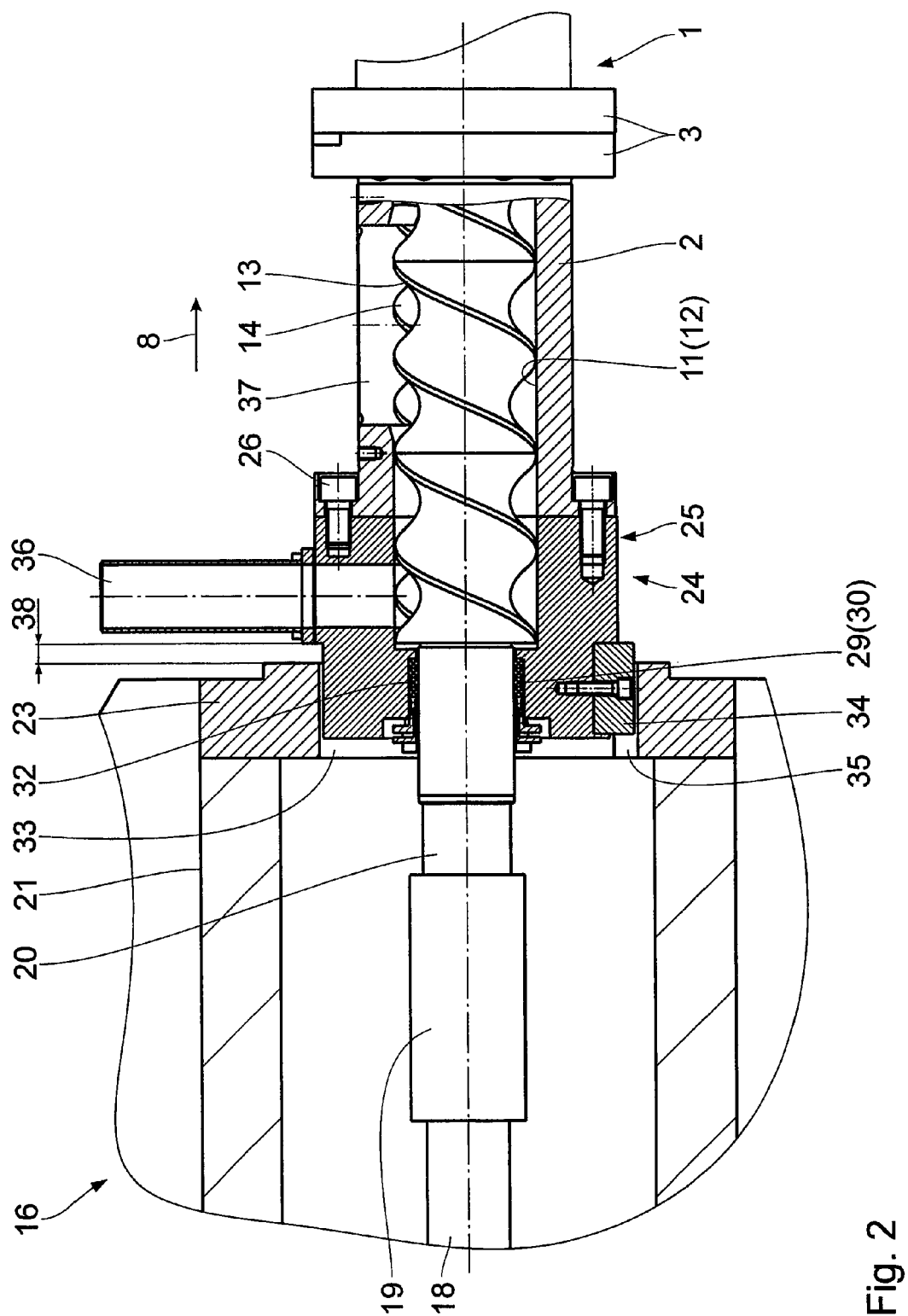
FIG. 2 shows a vertical partial longitudinal section through the screw machine according to FIG. 1 in the transition region from its housing to the gear.
Figure 3:
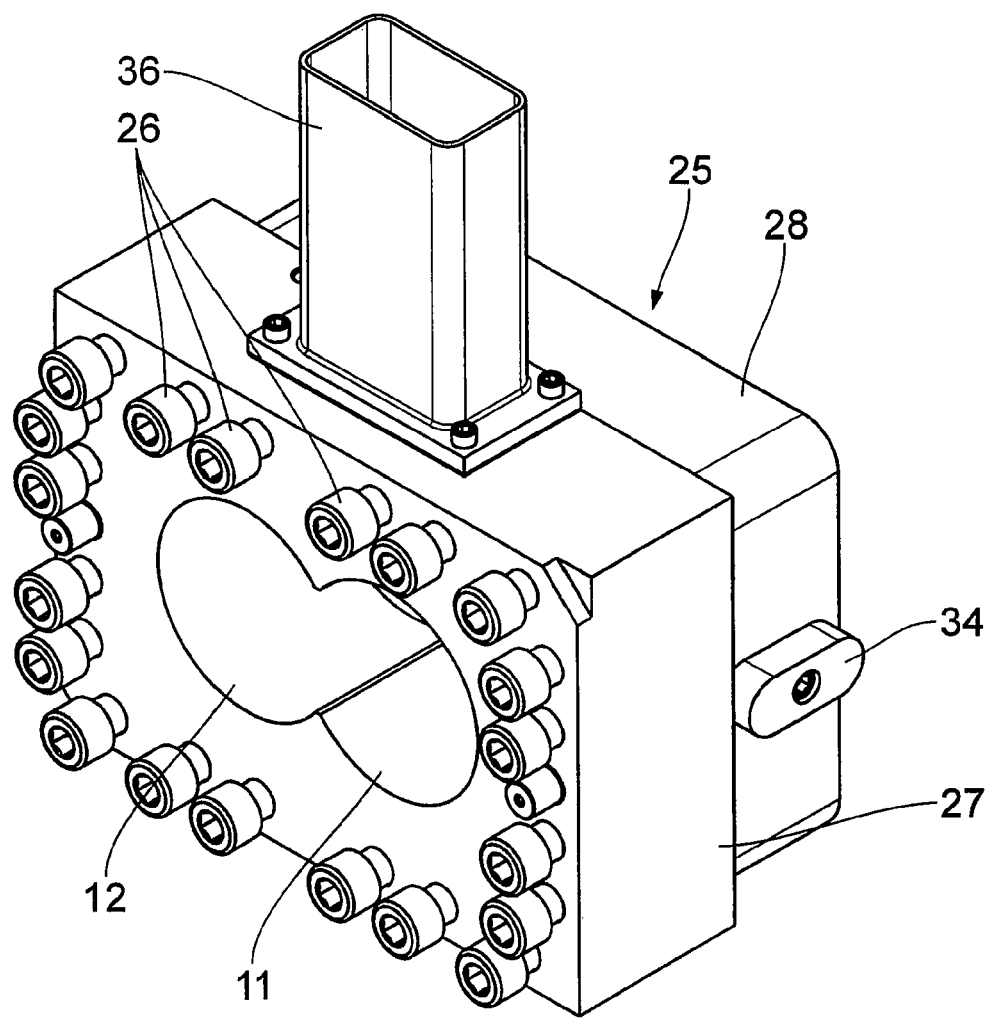
FIG. 3 shows a perspective view of an adapter from the transition region according to FIG. 2.
Figure 4:
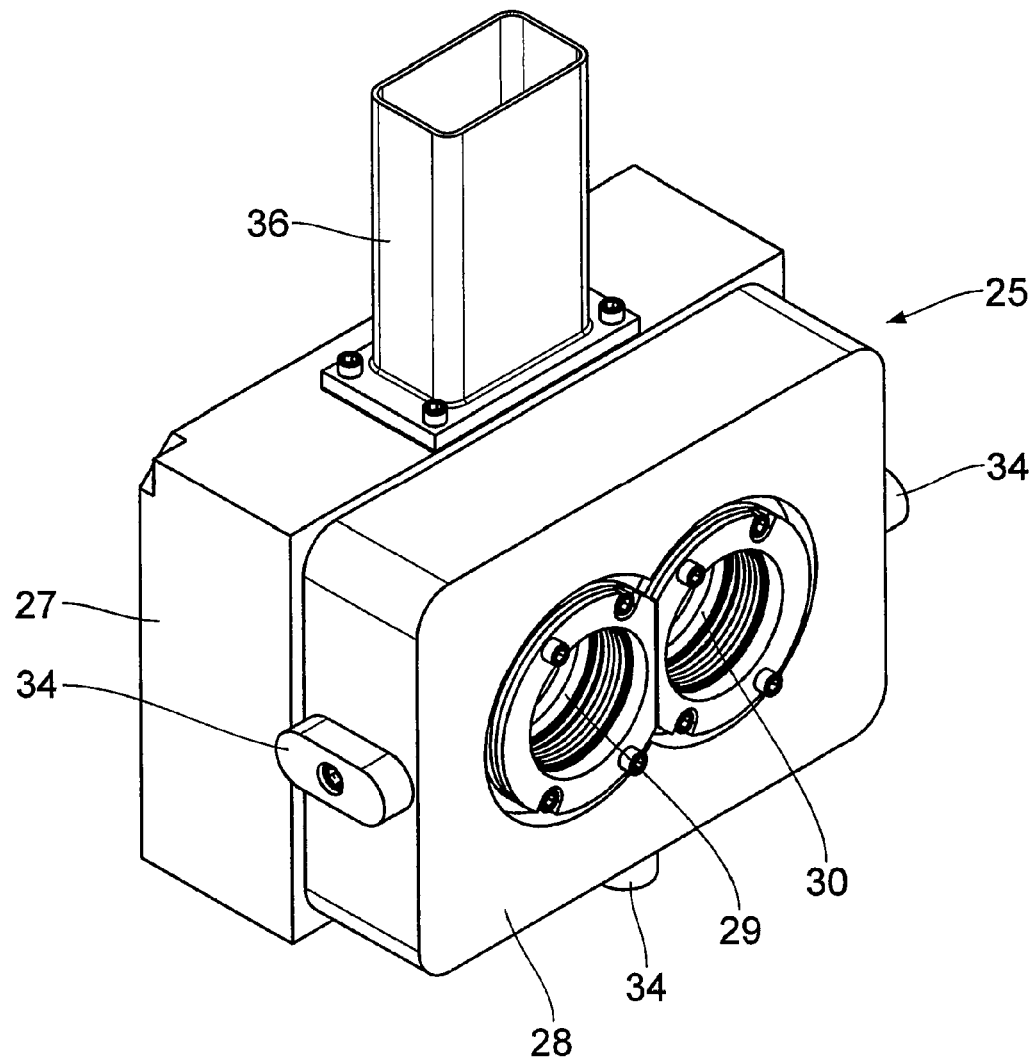
FIG. 4 shows a further perspective view of the adapter.

For this purpose, an adapter 25 is fastened by means of screws 26 to the flange 3 of the housing portion 2 which was mentioned and is adjacent to the attachment housing 21. The adapter 25 has two portions, namely a screw bore portion 27 adjacent to the adjacent housing portion 2, and a bearing portion 28. Configured in the screw bore portion 27, which is connected by means of the screws 26 to the adjacent housing portion 2, are the respective commencements of the screw bores 11, 12, into which—as can be inferred from FIG. 2—the screw shafts 13, 14 project. Configured in the bearing portion 28 are bearing bores 29, 30, in which the drive journals 20 of the screw shafts 13, 14 are rotatably mounted and sealed by means of seals 32, for example gland packings.

The bearing portion 28 is displaceably mounted in the direction of the axis in an adapted bearing opening 33 in the end wall 23 of the attachment housing 21, but supported perpendicularly with respect to this. In addition, fitted keys 34, which are guided in corresponding guide grooves 35 in the end wall 23, are attached to the bearing portion 28.

A rear gas venting channel 36 leads out of the screw bores 11, 12 in the screw bore section 27 of the adapter 25. Configured in the production direction 8, directly therebehind, in the first adjacent housing portion is a supply opening 37 for the material to be prepared or processed in the screw machine.

The working mechanism is as follows:

In particular due to the heating when being started up, the screw shafts 13, 14, on the one hand, and the housing 1, on the other hand, expand greatly because of the sharp temperature increase from room temperature to temperatures above 200° C. and optionally even above 300° C. The screw shafts 13, 14 conventionally fixed relative to the gear 16 in the direction of the longitudinal axis 7 expand in the direction of the end 9 of the housing 1, i.e. in the direction of their screw tips, not shown, as is generally conventional. The housing 1 in the region of its discharge end 9 is configured such that the screw shafts 13, 14 can expand in the housing 1 to the end thereof.

The housing 1, on the other hand, expands in the direction of the gear 16 because of the described configuration, the maximum axial play 38 between the screw bore portion 27 and the end wall 23 being of a size such that the bearing portion 28 can displace to an adequate extent in the bearing opening 33 toward the gear 16.

What is claimed is:

1. An extruder
    with a housing (1), which has
        at least one screw bore (11, 12), which is located in the housing (1), with a longitudinal axis (7),
        a supply end located at a first axial end of the housing (1)
        a discharge end (9) located at a second axial end of the housing (1) and
        a supply opening (37) at the supply end,
    with a screw shaft (13, 14) rotatably arranged in the screw bore (11, 12),
    with a drive motor (15),
    with a gear (16),
        which is in drive connection with the drive motor (15), and has an output shaft (18) connected to the screw shaft (13, 14),
    wherein a slide connection (24) is arranged between the housing (1) and the gear (16) in the direction of the longitudinal axis (7),
    wherein by means of the slide connection (24) thermally caused longitudinal expansions of the housing (1) are compensated for during start up of the extruder,
    wherein the slide connection (24) has an adapter (25), which has a screw bore portion (27) connected to the housing (1) and a bearing portion (28) facing the gear (16),
    wherein the screw shaft (13, 14) projects into the screw bore portion (27) of the adapter (25),
    wherein in the region of the discharge end (9), which is downstream in a production direction (8), the housing (1) is fixed by a connection (10) in both a vertical direction and the direction of the longitudinal axis (7),
    wherein an attachment housing (21) surrounding the output shaft (18) is provided on the gear (16) and has a bearing opening (33) supporting the housing (1) transversely with respect to the longitudinal axis (70); and
    wherein the bearing portion (28) of the adapter (25) is displaceably supported in the bearing opening (33) in the direction of the longitudinal axis (7) thereby forming said slide connection (24).

2. An extruder according to claim 1, wherein the screw shaft (13, 14) is non-displaceably connected to the output shaft (18), in the direction of the longitudinal axis (7).

3. An extruder according to claim 1,
    wherein a drive journal (20) of the screw shaft (13, 14) is mounted in a bearing bore (29, 30) of the adapter (25).

4. An extruder according to claim 1,
    wherein it is a two-shaft extruder.

5. An extruder according to claim 1,
    wherein the housing (1) is supportable by means of supports (4) in relation to a base (5) and
    wherein slide-bearings (6) are arranged between the supports (4) and the housing (1), by means of which slide-bearings (6) the housing (1) is displaceable in the direction of the longitudinal axis (7) in relation to the supports (4).

6. An extruder according to claim 1,
    wherein the housing (1) is composed of individual housing portions (2), which are connected to one another by means of flanges (3).

7. An extruder according to claim 6, wherein the adapter (25) is fastened by means of screws (26) to the flange (3) of the housing portion (2) which is adjacent to the attachment housing (21).

8. An extruder according to claim 1,
    wherein fitted keys (34), which are guided in corresponding guide grooves (35) in an end wall (23) of the attachment housing (21), are attached to the bearing portion (28).

* * * * *